US012634000B2

(12) United States Patent
Hatamian et al.

(10) Patent No.: US 12,634,000 B2
(45) Date of Patent: *May 19, 2026

(54) REPEATER SYSTEM AND METHOD FOR INDOOR DISTRIBUTION OF CELLULAR MMWAVE SIGNALS

(71) Applicant: PELTBEAM INC., Sherman Oaks, CA (US)

(72) Inventors: Mehdi Hatamian, Mission Viejo, CA (US); Shervin Alireza Odabaee, Newport Coast, CA (US); Puya Rofougaran, Irvine, CA (US); Arman Rofougaran, Newport Coast, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/341,408

(22) Filed: Sep. 26, 2025

(65) Prior Publication Data

US 2026/0025193 A1     Jan. 22, 2026

Related U.S. Application Data

(63) Continuation of application No. 19/033,537, filed on Jan. 22, 2025, now Pat. No. 12,451,957, which is a
(Continued)

(51) Int. Cl.
*H04W 72/30* (2023.01)
*H04B 7/155* (2006.01)
*H04W 72/0446* (2023.01)

(52) U.S. Cl.
CPC .... *H04B 7/15507* (2013.01); *H04W 72/0446* (2013.01); *H04W 72/30* (2023.01)

(58) Field of Classification Search
CPC .............. H04B 7/15507; H04W 72/30; H04W 72/0446
See application file for complete search history.

(56) References Cited

U.S. PATENT DOCUMENTS

2021/0119751 A1     4/2021  Mundarath et al.
2021/0306962 A1     9/2021  Abedini et al.
(Continued)

FOREIGN PATENT DOCUMENTS

WO        2017192023 A2    11/2017
WO        2020123012 A1     6/2020
WO        2021169716 A1     9/2021

OTHER PUBLICATIONS

Non-Final Office Action for U.S. Appl. No. 18/768,278 dated Sep. 16, 2024.
(Continued)

*Primary Examiner* — Melvin C Marcelo
(74) *Attorney, Agent, or Firm* — CHIP LAW GROUP

(57)                ABSTRACT

A repeater device having a donor radio antenna that captures publicly broadcast synchronization signals from an outdoor 5G Radio Access Network (RAN) node, and a controller that decodes the captured publicly broadcast synchronization signals from the outdoor 5G RAN node. The controller synchronizes with the decoded publicly broadcast synchronization signals, to align a frame structure of the donor radio antenna to a frame structure of the outdoor 5G RAN node, independent of additional signaling and explicit coordination from the outdoor 5G RAN node. The repeater device includes a relay radio antenna that communicates the synchronized publicly broadcast synchronization signals to a first set of indoor relay devices. The controller executes frequency or spatial isolation, to reduce interference between user equipment (UEs) of one or more indoor UEs
(Continued)

associated with the outdoor 5G RAN node, independent of the explicit coordination from the outdoor 5G RAN node.

20 Claims, 7 Drawing Sheets

Related U.S. Application Data continuation of application No. 18/768,278, filed on Jul. 10, 2024, now Pat. No. 12,237,907, which is a continuation of application No. 18/397,959, filed on Dec. 27, 2023, now Pat. No. 12,107,660.

(56)                    References Cited

U.S. PATENT DOCUMENTS

2021/0376912 A1    12/2021   Black et al.
2022/0240305 A1     7/2022   Black et al.

OTHER PUBLICATIONS

Non-Final Office Action for U.S. Appl. No. 18/397,959 dated Mar. 26, 2024.
Notice of Allowance for U.S. Appl. No. 18/397,959 dated Jun. 3, 2024.
Notice of Allowance for U.S. Appl. No. 18/768,278 dated Oct. 23, 2024.

100

400

Capture publicly broadcast synchronization signals from outdoor 5G RAN node by donor radio antenna of first repeater device 402

Scan a 5G NR frequency spectrum using FFT operation with variable FFT size to adapt to different SSB signal power levels to detect any SSB transmissions from the outdoor 5G RAN node 402A Decode the publicly broadcast synchronization signals from outdoor 5G RAN node captured by the donor radio antenna 404

Decode PBCH in SSB to acquire cell identity and confirm that the SSB is from a target gNodeB to which repeater system is to be synchronized 404A Decode Physical Downlink Control Channel (PDCCH) signals from the outdoor 5G RAN during a communication session 404B Extract beam configuration commands intended for each target UE of the one or more indoor UEs based on the decoding of the PDCCH signals 404C Synchronize first repeater device with the decoded publicly broadcast synchronization signals to align a frame structure of donor radio antenna to the frame structure of the outdoor 5G RAN node 406

Execute time and frequency synchronization to the outdoor 5G RAN node based on decoding of synchronization signal blocks without the explicit coordination from the outdoor 5G RAN node 406A Estimate a carrier frequency offset (CFO) by analyzing synchronization signal blocks signal's phase rotation in a frequency domain in the frequency synchronization 406B Compensate for CFO in local oscillator to align first repeater device to a carrier frequency of outdoor 5G RAN node 406C

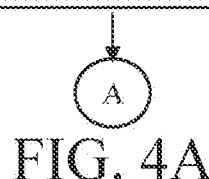

A

Communicate synchronized 5G signals from donor radio antenna by relay radio antenna to one or more indoor relay devices for indoor distribution of the synchronized 5G signals to serve one or more indoor UEs, based on the captured and decoded publicly broadcast synchronization signals, wherein capture, decoding, synchronization, and communication of the synchronized 5G signals for the indoor distribution of the synchronized 5G signals, is independent of any additional signaling and explicit coordination from the outdoor 5G RAN node
408

Re-configure access beams from relay radio antenna to match UE directions of the one or more indoor UEs commanded by the outdoor 5G RAN node independent of the additional signaling and explicit coordination from the outdoor 5G RAN node 410

Self-configure beam configurations communicated from relay radio antenna to the one or more indoor UEs directly or via the one or more indoor relay devices, based on information related to the one or more indoor UEs captured from the outdoor 5G RAN node 412

Determine path loss to each UE of the one or more indoor UEs based on Channel State Information Reference Signals (CSI-RS) channel independent of the explicit coordination from the outdoor 5G RAN node 414

Adjust transmit power from relay radio antenna and each of a plurality of indoor relay devices based on the determined path loss 416

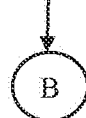

400

C

Re-configure, by the central cloud server, 5G wireless mesh network to proactively mitigate the anticipated traffic load and the bandwidth demand per zone 428

Perform antenna re-configuration of an indoor relay device to adjust beamforming settings and Multiple-Input, Multiple-Output (MIMO) configurations 428A Perform carrier aggregation by concurrently using a plurality of frequency bands to increase data rates in one or more affected zones in which the traffic load and bandwidth demand are anticipated 428B Identify one or more alternative connectivity paths among the plurality of indoor relay devices to proactively mitigate the anticipated traffic load and bandwidth demand in the one or more affected zones 428C

FIG. 4D

REPEATER SYSTEM AND METHOD FOR INDOOR DISTRIBUTION OF CELLULAR MMWAVE SIGNALS

CROSS-REFERENCE TO RELATED APPLICATIONS/INCORPORATION BY REFERENCE

This patent application makes reference to, claims priority to, claims the benefit of, and is a Continuation Application of U.S. patent application Ser. No. 19/033,537 filed on Jan. 22, 2025, which is a Continuation Application of U.S. Pat. No. 12,237,907 issued on Feb. 25, 2025, which claims priority to U.S. Pat. No. 12,107,660, issued on Oct. 1, 2024. Each of the above-referenced applications is hereby incorporated herein by reference in its entirety.

FIELD OF TECHNOLOGY

Certain embodiments of the disclosure relate to telecommunication systems. More specifically, certain embodiments of the disclosure relate to a repeater system and a method for indoor distribution of cellular mmWave signals for high-performance wireless communication overcoming path loss and expanding indoor coverage of cellular mmWave signals, i.e., outdoor-to-indoor (O2I) distribution of fifth generation (5G) signals.

BACKGROUND

Typically, users near the edge of the cell in cellular networks often suffer from low signal-to-interference-plus-noise ratio (SINR) levels due to being far away from a radio access network (RAN) node (e.g., a 5G base station or a 5G small cell). The cell-edge problem in cellular networks refers to the issue of poor signal quality and low data rates experienced by users located at the edge of the cell. This problem arises due to weak signal strength caused by distance-dependent path loss and multipath fading. It may not always be a feasible solution to increase the base station transmit power as it can lead to increased inter-cell interference. In 5G mobile communication systems, achieving outdoor-to-indoor (O2I) coverage in urban areas is vital for network deployment. To enable ultra-high data rates, 5G uses the millimeter wave (mmWave) band for O2I coverage. However, this presents challenges due to significant path loss and near-total signal blocking by building walls. In practice, it is observed that the received power decays quickly with the depth of an indoor position due to large path loss and consequently, in many indoor scenarios, mm Wave cannot adequately provide coverage to inner spaces of buildings.

Generally, RF repeater system may be used to extend the range of a wireless signal by receiving, amplifying, and retransmitting it to the intended receiver. In any mobile network, devices must maintain an adequate link budget on both the Downlink (DL) and Uplink (UL) for both control signaling and user data. However, conventional RF repeater systems face certain challenges with regards to link budget due to window and building penetration losses. Typically, when a radio signal passes through a window or a building, it can experience attenuation due to absorption, reflection, and scattering. Moreover, when the conventional repeater system is placed inside a building, it can experience additional losses due to absorption, reflection, and scattering. This can reduce the signal strength, leading to a reduction in the overall link budget. Further, a conventional 5G Integrated Access and Backhaul (IAB) systems may be used, but conventional 5G IAB systems face technical challenges related to coordination, complexity, cost, and adaptability. For example, standard 5G IAB systems require extensive coordination with gNodeB (gNBs) and user equipment (UEs) to achieve synchronization. This coordination can introduce delays and complexity into the network setup. Further, similar to synchronization, beam management in a standard 5G IAB relies on coordination with gNBs and UEs. This coordination is necessary to determine the optimal beam for each UE, but it can also lead to increased signaling overhead and potential delays. Furthermore, standard 5G IAB systems may not operate as standalone repeaters. They are often part of a larger network infrastructure, which can limit their deployment flexibility. This requires careful attention to the design and deployment of the repeater systems. Thus, there are many open technical challenges for successful and practical use of the repeater systems.

In a first example, one of the most prominent technical issue is how to achieve cell center like performance even in the cell edge areas using a repeater system without increasing the telecommunications infrastructure cost. Currently, conventional repeater system's performance becomes significantly degraded as the distance from the cellular signal source (e.g., the base station or a small cell) increases, for example, at the cell edge areas. In a second example, Quality of experience (QoE) is another open issue, which is a measure of a user's holistic satisfaction level with a service provider (e.g., Internet access, video streaming, or other carrier network-enabled services). The challenge is how to ensure seamless connectivity as well as QoE without significantly increasing infrastructure cost, which may be commercially unsustainable with present solutions. Further in indoor scenarios, like a home or an enterprise, poor signal strength from a wireless network, for example, due to the window and building penetration losses, can make surfing the internet and downloading or uploading content a frustrating experience irrespective of being located at the cell-center or cell-edge. Furthermore, the number of wireless sensors and IoT devices are rapidly increasing with the increase in smart homes, smart offices, enterprises, etc. Existing communication systems are unbale to handle such massive number of wireless sensors and IoT devices and their quality-of-service (QOS) requirements. In such cases, it is extremely difficult and technically challenging to support these end user devices for high-speed low latency applications.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A repeater system and a method for indoor distribution of cellular mmWave signals for high-performance wireless communication overcoming path loss and expanding indoor coverage of cellular mmWave signals, i.e., outdoor-to-indoor (O2I) distribution of fifth generation (5G) signals, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

BRIEF DESCRIPTION OF DRAWINGS

FIGS. 4A, 4B, 4C, and 4D collectively is a diagram illustrating an exemplary method for indoor distribution of cellular mmWave signals, in accordance with an embodiment of the disclosure.

DETAILED DESCRIPTION OF THE DISCLOSURE

Certain embodiments of the disclosure may be found in a repeater system and a method for indoor distribution of cellular mmWave signals for high-performance wireless communication overcoming path loss and expanding indoor coverage of cellular mmWave signals, i.e., outdoor-to-indoor (O2I) distribution of fifth generation (5G) signals. The repeater system overcomes scanning loss, signal attenuating or blocking obstacles, bring street side cellular 5G signal indoors, and significantly enhances QoE of the one or more indoor user equipment (UEs) in an indoor area connected to the repeater system.

Beneficially, the repeater system of the present disclosure is capable of autonomously synchronizing with an outdoor 5G Radio Access Network (RAN) node by decoding publicly broadcast synchronization signals. This autonomous synchronization ensures that the frame structure of the donor radio antenna aligns precisely with that of the outdoor 5G RAN node. This advantage eliminates the need for additional signaling or explicit coordination from the outdoor network, simplifying deployment and reducing potential points of failure in the synchronization process. Secondly, the disclosed repeater system operates independently of any additional signaling or explicit coordination from the outdoor 5G RAN node. This independence is one of the technical advantages as it reduces complexity in the overall network architecture. It means that the indoor distribution of synchronized 5G signals can be achieved without relying on external control, making the system more robust and adaptable to different outdoor network configurations and changes. Thirdly, the relay radio antenna of the repeater system efficiently communicates synchronized 5G signals to one or more indoor relay devices for distribution to indoor user equipment (UEs). By capturing, decoding, and synchronizing with publicly broadcast synchronization signals, the system ensures that the indoor distribution of synchronized 5G signals is precise and reliable without adding any extra layer of additional signaling and associated complexity. This technical advantage results in improved indoor network coverage and performance, enhancing the quality of service for indoor users without introducing unnecessary complexity and delays.

In the following description, reference is made to the accompanying drawings, which form a part hereof, and in which are shown, by way of illustration, various embodiments of the present disclosure.

Figure 1:
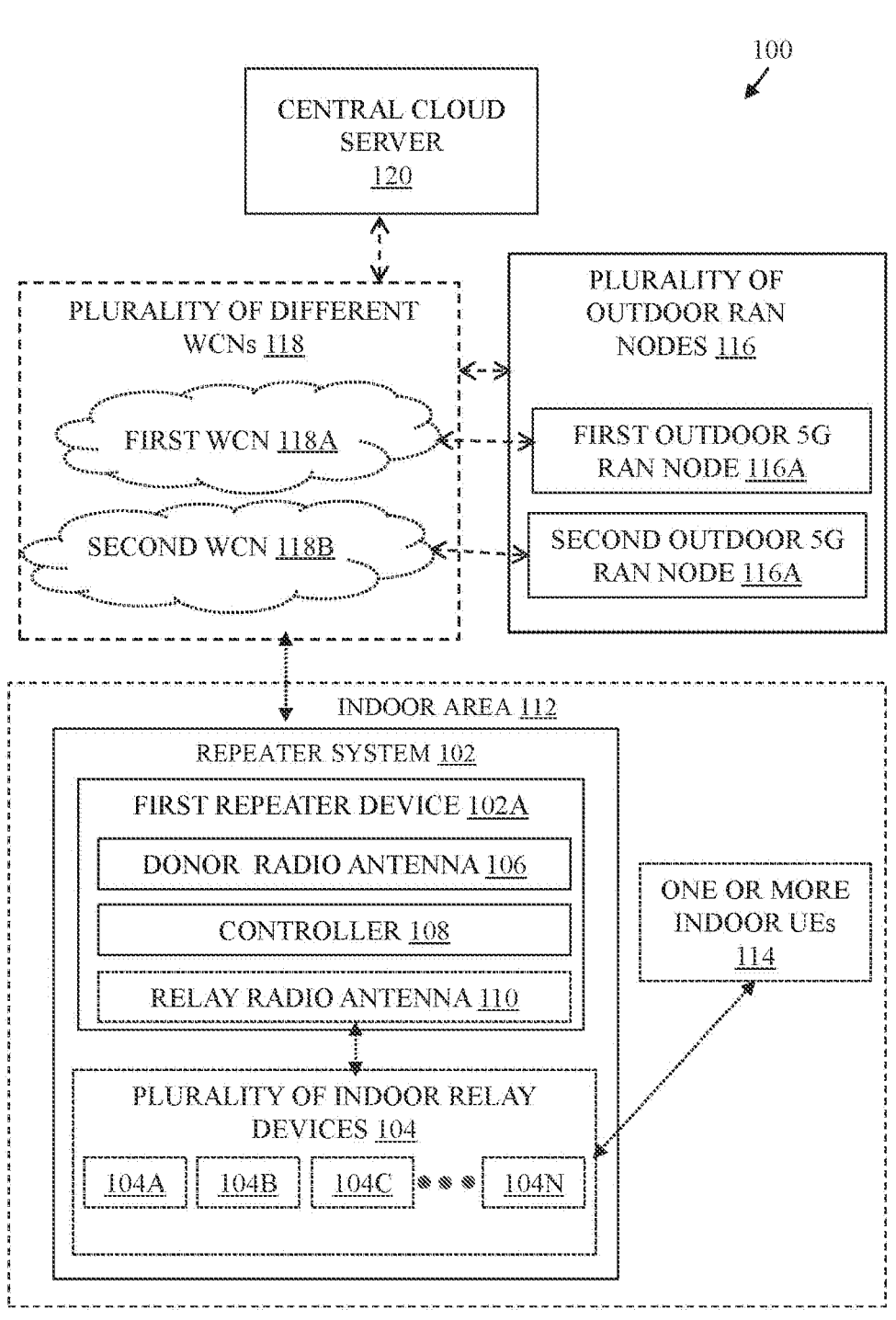
FIG. 1 is a diagram illustrating a network environment of an exemplary repeater system, in accordance with an exemplary embodiment of the disclosure.

FIG. 1 is a diagram illustrating a network environment of an exemplary repeater system, in accordance with an exemplary embodiment of the disclosure. With reference to FIG. 1, there is shown a network environment 100 of a repeater system 102. The repeater system 102 may include a one-box repeater (e.g., a first repeater device 102A) or a multi-box repeater, such as a two-box, a three-box, or a four-box repeater (e.g., the first repeater device 102A in addition to a plurality of indoor relay devices 104, such as the indoor relay devices 104A, 104B, 104C, . . . , 104N).

The first repeater device 102A may include one or more donor radio antennas, such as a donor radio antenna 106, a controller 108, and one or more relay radio antennas, such as a relay radio antenna 110. There is further shown one or more indoor user equipment (UEs) 114, a plurality of outdoor Radio Access Network (RAN) nodes 116 (e.g., a first outdoor 5G RAN node 116A and a second outdoor 5G RAN node 116B), a plurality of different wireless carrier networks (WCNs) 118 (e.g., a first WCN 118A and a second WCN 118B), and a central cloud server 120. In an implementation, the repeater system 102 may be communicatively coupled to the central cloud server 120.

In an implementation, the repeater system 102 may be designed and developed to overcome link budget challenges due to window and building penetration losses. The repeater system 102 may include a plurality of repeater devices, such as the first repeater device 102A and the plurality of indoor relay devices 104. In an implementation, the first repeater device 102A as well as the plurality of indoor relay devices 104 may be distributed in an indoor area 112. In another implementation, the plurality of indoor relay devices 104 may be distributed at different locations in the indoor area 112 whereas the first repeater device 102A may be placed either outdoors or strategically located indoors, such as near a window or an area from where the donor radio antenna 106 is oriented to face an outdoor 5G RAN node, such as the first outdoor 5G RAN node 116A or the second outdoor 5G RAN node 116B, to capture 5G signals.

The first repeater device 102A may include suitable logic, circuitry, and interfaces that may be configured to communicate with a radio access network (RAN) node, such as the first outdoor 5G RAN node 116A or a second outdoor 5G RAN node 116B. The repeater system 102 enables data communication at a multi-gigabit data rate. In an implementation, the repeater system 102 may be a C-band indoor repeater system that may operate in C-band frequencies (e.g., 4-8 GHz or 3.7-4.2 GHZ) for 5G NR communication. One or more C-Band indoor repeaters (e.g., the first repeater device 102A and/or the one or more indoor relay devices 104) of the repeater system 102 may operate in conjunction with indoor C-Band fixed wireless access (FWA) modems to ensure sufficient link margins to achieve pre-defined customer data rates (i.e., data throughput rates). In an implementation, the one or more C-Band indoor repeaters (e.g., the first repeater device 102A and/or the one or more indoor relay devices 104) of the repeater system 102 may be 5G NR indoor repeaters that may support all channel bandwidths up to, for example, 100 MHz or multigigabit. Further, the first repeater device 102A may support a plurality of components carriers, for example, four component carriers and a total aggregated bandwidth, for example, approximately of 200 MHz in an example. Furthermore, the one or more C-Band indoor repeaters (e.g., the first repeater device 102A and/or the one or more indoor relay devices 104) of the repeater system 102 may support both downlink and uplink 4×4

MIMO on bands n77, which is a 5G NR frequency band commonly known as C-band 5G.

In another implementation, the repeater system 102 may support multiple and a wide range of frequency spectrum, for example, 4G, 5G, and upcoming 6G (including out-of-band frequencies). Each of the plurality of indoor relay devices 104 may be a service side relays that may be communicatively coupled to the donor, such as the first repeater device 102A at one end and service the one or more indoor UEs 114 from another end. Examples of implementation of each of the first repeater device 102A and the plurality of indoor relay devices 104, may include but may not be limited to a 5G-enabled repeater device, an RF relay device, a FR1 and FR2 band of 5G NR supporting repeater device, a customer premise equipment, a Fixed wireless access (FWA) equipment, and the like.

Each of the donor radio antenna 106 and the relay radio antenna 110 may be an antenna that may operate in one or more of: a C-band, FR1 band of 5G NR, FR2 band of 5G NR, LTE band, and the like. In an implementation, each of the donor radio antenna 106 and the relay radio antenna 110 may be a patch antenna. In an implementation, each of the donor radio antenna 106 and the relay radio antenna 110 may be a phase-array antenna, an individual antenna, an XG phased-array antenna panel, an XG-enabled antenna chipset, an XG-enabled patch antenna array, or an XG-enabled servo-driven antenna array, where the "XG" refers to 5G or 6G. Examples of implementations of the XG phased-array antenna panel include, but is not limited to, a linear phased array antenna, a planar phased array antenna, a frequency scanning phased array antenna, a dynamic phased array antenna, and a passive phased array antenna. Examples of the controller 108 may include but are not limited to a digital signal processor (DSP), a central processing unit (CPU), a field programmable gate array (FPGA), a combination of CPU and FPGA, or other control circuitry.

Each of the one or more indoor UEs 114 may correspond to a telecommunication hardware used by an end-user to communicate. Alternatively stated, the one or more indoor UEs 114 may refer to a combination of a mobile equipment and subscriber identity module (SIM). Each of the one or more indoor UEs 114 may be subscriber of at least one or more of the plurality of different WCNs 118. Examples of the one or more indoor UEs 114 may include, but are not limited to a smartphone, a virtual reality headset, an augment reality device, a wireless modem, a customer-premises equipment (CPE), a home router, a cable or satellite television set-top box, a VoIP station, a user device, or any other customized hardware for telecommunication.

Each of the plurality of outdoor RAN nodes 116 may be a fixed point of communication that may communicate information, in form of a plurality of beams of RF signals, to and from communication devices, such as the repeater system 102 and one or more indoor UEs 114. Multiple base stations corresponding to one service provider, may be geographically positioned to cover specific geographical areas. Typically, bandwidth requirements serve as a guideline for a location of a base station, such as a gNB, based on relative distance between the UEs and the base station. The count of base stations depends on population density and geographic irregularities, such as buildings and mountain ranges, which may interfere with the plurality of beams of RF signals. In an implementation, each of the plurality of outdoor RAN nodes 116 may be a gNB or a 5G small cell. In another implementation, the plurality of outdoor RAN nodes 116 may include eNBs, Master eNBs (MeNBs) (for non-standalone mode), and gNBs.

Each of the plurality of different WCNs 118 may be owned, managed, or associated with a mobile network operator (MNO), also referred to as a mobile carrier, a cellular company, or a wireless service provider that provides services, such as voice, SMS, MMS, Web access, data services, and the like, to its subscribers, over a licensed radio spectrum. Each of the plurality of different WCNs 118 may own or control elements of a network infrastructure to provide services to its subscribers over the licensed spectrum, for example, 4G LTE, or 5G spectrum (FR1 or FR2). For example, the first outdoor 5G RAN node 116A may be controlled, managed, or associated with the first WCN 118A, and the second outdoor 5G RAN node 116B may be controlled, managed, or associated with the second WCN 118B different from the first WCN 118A. The plurality of different WCNs 118 may also include mobile virtual network operators (MVNO).

The central cloud server 120 includes suitable logic, circuitry, and interfaces that may be configured to communicate with the repeater system 102 and/or the plurality of outdoor RAN nodes 116. In an example, the central cloud server 120 may be a remote management server that is managed by a third party different from the service providers associated with the plurality of different WCNs 118. In another example, the central cloud server 120 may be a remote management server or a data center that is managed by a third party, or jointly managed, or managed in coordination and association with one or more of the plurality of different WCNs 118. In an implementation, the central cloud server 120 may be a master cloud server or a master machine that is a part of a data center that controls an array of other cloud servers communicatively coupled to it, for load balancing, running customized applications, and efficient data management.

Typically, users near the edge of the cell in cellular networks often suffer from low signal-to-interference-plus-noise ratio (SINR) levels due to being far away from a base station. Further, when a radio signal passes through a window or a building, it can experience attenuation due to absorption, reflection, and scattering. Moreover, when the conventional repeater system is placed inside a building, it can experience additional losses due to absorption, reflection, and scattering. This can reduce the signal strength, leading to a reduction in the overall link budget.

Beneficially, the repeater system 102 significantly improves the data throughput rate and SNR of the one or more indoor UEs 114 connected to the repeater system 102. The repeater system 102 enables outdoor-to-indoor (O2I) distribution of fifth generation (5G) signals overcoming path loss and expanding indoor coverage of cellular mmWave signals without increasing any delays and complexity.

In an example, conventional systems require extensive coordination with gNodeB (gNBs) and user equipment (UEs) to achieve synchronization. This coordination can introduce delays and complexity into the network setup. Further, similar to synchronization, beam management in a standard 5G IAB relies on coordination with gNBs and UEs. This coordination is necessary to determine the optimal beam for each UE, but it can also lead to increased signaling overhead and potential delays. Furthermore, standard 5G IAB systems may not operate as standalone repeaters. They are often part of a larger network infrastructure, which can limit their deployment flexibility. This requires careful attention to the design and deployment of the repeater systems.

In contrast to the conventional systems, the repeater system 102 of the present disclosure captures and decodes publicly broadcast synchronization signals and uses the decoded publicly broadcast synchronization signals for various purposes, such as synchronizes with an outdoor 5G Radio Access Network (RAN) node, such as the first outdoor 5G RAN node 116A. By capturing, decoding, and synchronizing with publicly broadcast synchronization signals, the system ensures that the indoor distribution of synchronized 5G signals is precise and reliable without adding any extra layer of additional signaling and associated complexity. This technical advantage results in improved indoor network coverage of 5G signals and performance, enhancing the quality of service for indoor users without introducing unnecessary complexity and delays. Thus, the repeater system 102 not only achieves cell center like performance even in the cell edge areas but also ensures a seamless connectivity as well as QoE without increasing the telecommunications infrastructure cost.

Figure 2:
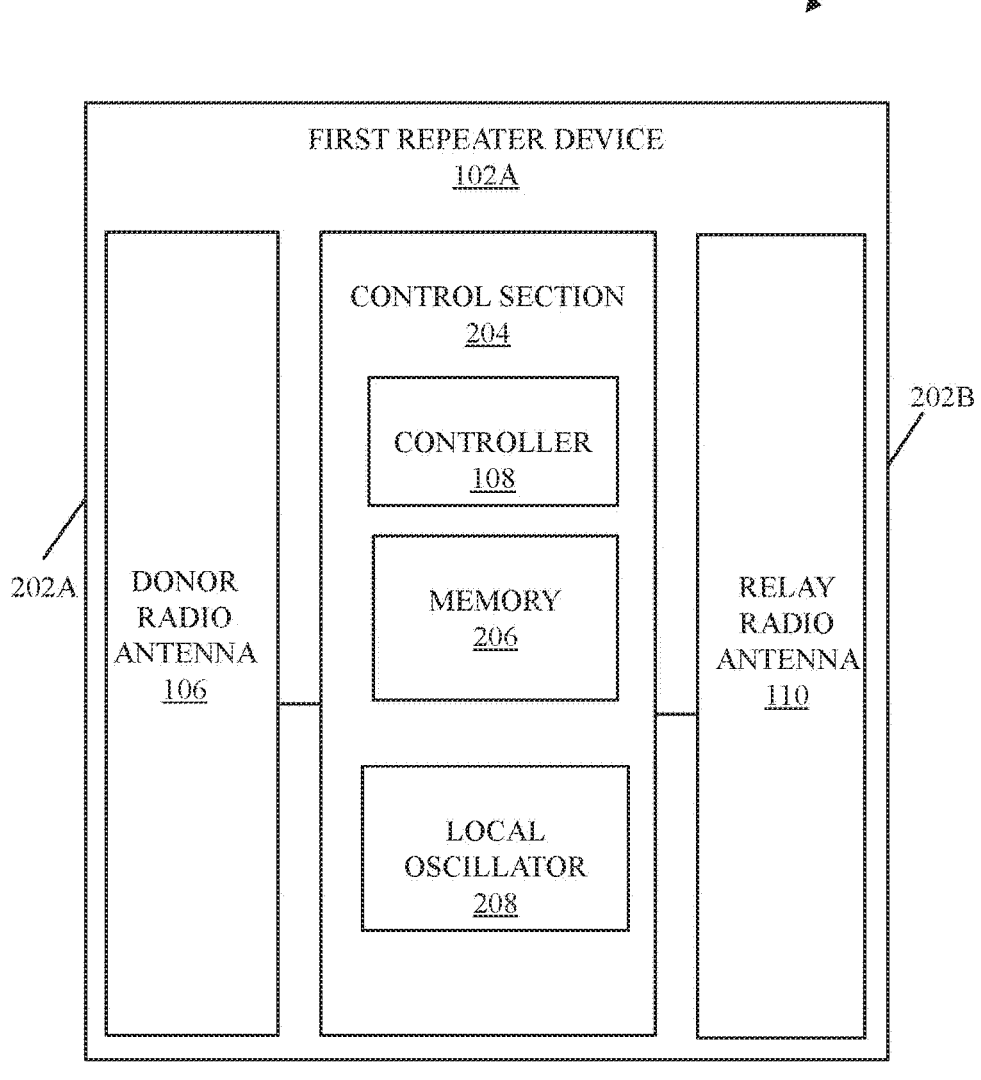
FIG. 2 is a block diagram of an exemplary repeater device, in accordance with an exemplary embodiment of the disclosure.

FIG. 2 is a block diagram of an exemplary repeater device, in accordance with an exemplary embodiment of the disclosure. FIG. 2 is explained in conjunction with elements from FIG. 1. With reference to FIG. 2, there is shown a block diagram 200 of the first repeater device 102A of FIG. 1. The first repeater device 102A may have a donor side 202A and a relay side 202B. The first repeater device 102A may include a control section 204, which may include the controller 108, a memory 206, and a local oscillator 208. The control section 204 may be communicatively coupled to a front-end RF section, which may include one or more antenna arrays, such as the donor radio antenna 106 and the relay radio antenna 110. Each indoor relay device may be similar to that of the first repeater device 102A. Each of the first repeater device 102A and each indoor relay device may include more than one donor and relay radio antennas. In an implementation, each indoor relay device may include two relay radio antennas or an array of antennas that may perform the function of both transmit and receive using time-division duplexing (TDD) or frequency-division duplexing (FDD).

The controller 108 may be communicatively coupled to the memory 206, the local oscillator 208, the donor radio antenna 106 and the relay radio antenna 110. The controller 108 may be configured to execute various operations of the first repeater device 102A.

The memory 206 may be configured to store instructions and information obtained from the central cloud server 120. Examples of the implementation of the memory 206 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that the control section 204 may further include one or more other components, such as an analog to digital converter (ADC), a digital to analog (DAC) converter, a cellular modem, and the like, known in the art, which are omitted for brevity.

The local oscillator 208 is configured to generate a reference frequency for the first repeater device 102A. The synchronization process involves estimating a Carrier Frequency Offset (CFO) by analyzing the phase rotation of synchronization signal blocks in the frequency domain. Once this CFO is determined, the local oscillator 208 may be adjusted or compensated to align the first repeater device 102A precisely with the carrier frequency of an outdoor 5G RAN node, such as a gNB.

In operation, the donor radio antenna 106 of the first repeater device 102A may be configured to capture publicly broadcast synchronization signals from an outdoor 5G RAN node, such as the first outdoor 5G RAN node 116A. In an implementation, the publicly broadcast synchronization signals intended for the one or more indoor UEs 114 may comprise a Primary Synchronization Signal (PSS) and a Secondary Synchronization Signal (SSS). The publicly broadcast synchronization signals intended for the one or more indoor UEs 114 may further comprise broadcast channel information comprising system parameters and configuration for operation of the one or more indoor UEs 114, reference signals for channel estimation, synchronization and cell information, beamforming information, and cell identity.

In accordance with an embodiment, the capturing of the publicly broadcast synchronization signals in a 5G New Radio (NR) frequency band may comprise scanning a 5G NR frequency spectrum using a Fast Fourier Transform (FFT) operation with variable FFT size to adapt to different Synchronization Signal Block (SSB) signal power levels to detect any SSB transmissions from the outdoor 5G RAN node (e.g., the first outdoor 5G RAN node 116A). In other words, the donor radio antenna 106 may be configured to perform frequency scanning technique in which the entire 5G NR frequency band is scanned using the FFT operation to detect peaks corresponding to SSB signals. This FFT operation, spanning the full bandwidth, transforms the RF signals from the time to the frequency domain. Peaks observed in the FFT output may indicate the presence of specific signals, in this case, the synchronization signal blocks (SSBs). The size of the FFT may be associated with determining the frequency resolution of the scan. For example, the use of larger FFT sizes (greater than a defined threshold) enhances the system's capability to detect SSBs with lower power levels. To enhance accuracy, the FFT may be executed over multiple symbol periods that helps average out the noise floor and ensures more reliable detection of SSBs amid varying signal strengths and environmental conditions. The noise floor refers to the level of background noise or unwanted signals present in a system or environment. The noise floor is the level below which signals become challenging to distinguish or detect because they are obscured by this inherent noise. The FFT allows examining the entire bandwidth at once to find the SSB peak locations in the frequency domain.

The controller 108 may be further configured to decode the publicly broadcast synchronization signals from the outdoor 5G RAN node (e.g., the first outdoor 5G RAN node 116A) captured by the donor radio antenna 106. In other words, once the SSB peaks arc detected in the frequency domain, the controller 108 may be further configured to isolate the SSB resource blocks and a confirmation is made whether SSB is from a target gNB, such as the from the outdoor 5G RAN node (e.g., the first outdoor 5G RAN node 116A).

In accordance with an embodiment, the decoding of the publicly broadcast synchronization signals from the outdoor 5G RAN node (e.g., the first outdoor 5G RAN node 116A) may comprise decoding Physical Broadcast Channel (PBCH) in Synchronization Signal Block (SSB) to acquire cell identity and confirm that the SSB is from a target gNodeB to which the repeater system is to be synchronized. The target gNodeB may be the outdoor 5G RAN node (e.g., the first outdoor 5G RAN node 116A). Alternatively stated, upon detecting synchronization signal block (SSB) peaks in the frequency domain, the controller 108 of the first repeater device 102A may take a sequence of actions. Firstly, the controller 108 may be configured to isolate the specific resource blocks associated with the detected SSB. Following this, the controller 108 may be configured to demodulate and decode the Physical Broadcast Channel (PBCH) signal contained within the SSB. The decoding allows the extraction of information such as the cell ID and other transmission parameters. Subsequently, the controller 108 may be configured to check the extracted cell ID against the ID of the target gNB (gNodeB) with which synchronization is sought. This thorough process ensures accurate identification of the gNB facilitating the synchronization process by verifying alignment with the intended target gNB.

The controller 108 may be further configured to synchronize with the decoded publicly broadcast synchronization signals to align a frame structure of donor radio antenna 106 to the frame structure of the outdoor 5G RAN node (e.g., the first outdoor 5G RAN node 116A). This synchronization process ensures that the repeater device 102A may operate seamlessly with the outdoor 5G RAN node. By aligning the frame structure, the repeater device 102A ensures that it operates on the same time reference and follows the same frame structure as the outdoor 5G RAN node. This synchronization enables the first repeater device 102A to avoid interference, optimizing signal reception and transmission, and maintaining the overall integrity of the communication link.

In accordance with an embodiment, the synchronization with the decoded publicly broadcast synchronization signals from the outdoor 5G RAN node (e.g., the first outdoor 5G RAN node 116A) may comprise executing time and frequency synchronization to the outdoor 5G RAN node (e.g., the first outdoor 5G RAN node 116A) based on decoding of synchronization signal blocks without the explicit coordination from the outdoor 5G RAN node (e.g., the first outdoor 5G RAN node 116A). The time synchronization comprises using a Synchronization Signal Block (SSB) correlator to align with the symbol timing of the outdoor 5G RAN node (e.g., the target gNB) and continually tracking this timing for ongoing synchronization. Firstly, the controller 108 may be configured to process the decoded SSB sequence through a matched filter correlator in the memory 206. This operation detects the peak correlation location, pinpointing the symbol timing alignment with the 5G RAN node's SSB transmissions. The matched filter correlator may interpolate between samples, allowing for sub-sample timing precision, enhancing the accuracy of synchronization. The continuous tracking of the SSB peak location over time ensures that as the signal propagates and conditions change, the repeater system 102 maintains a consistent and precise time alignment. The SSB may include a predefined synchronization sequence, where the controller 108 may pass the predefined synchronization sequence through the matched filter correlator to identify the peak correlation point, which provides a symbol-level time alignment with SSB transmissions from the outdoor 5G RAN node (e.g., the target gNB). Thus, a robust and continuous time synchronization may be ensured in the first repeater device 102A.

In accordance with an embodiment, the frequency synchronization may comprise estimating the Carrier Frequency Offset (CFO) from the Synchronization Signal Block (SSB) frequency signal and compensating the local oscillator 208 based on the estimated CFO. In other words, the synchronization with the decoded publicly broadcast synchronization signals from the outdoor 5G RAN node (e.g., the first outdoor 5G RAN node 116A) may further comprise estimating the CFO by analyzing synchronization signal blocks signal's phase rotation in a frequency domain in the frequency synchronization, and compensating for the CFO in the local oscillator 208 to align the first repeater device 102A to a carrier frequency of the outdoor 5G RAN node (e.g., the first outdoor 5G RAN node 116A). From the frequency domain SSB signal, the controller 108 may be configured to estimate the phase rotation across the SSB tones to estimate carrier frequency offset. The estimate may be updated continuously or periodically. In the frequency domain, signals are often represented as a combination of different tones or frequencies. The phase rotation across the SSB tones refers to how the phase (or the timing of the signal) changes from one frequency component (i.e., tone) to another within the SSB signal. The phase rotation may be proportional to the offset between the local oscillator 208 and the carrier frequency (5G carrier frequency) of the outdoor 5G RAN node (e.g., the first outdoor 5G RAN node 116A like the gNB). The compensating for the CFO in the local oscillator 208 aligns it to the gNB's carrier frequency (i.e., aligns to the 5G carrier frequency of the outdoor 5G RAN node), thereby achieving the frequency synchronization.

The relay radio antenna 110 of the first repeater device 102A may be configured to communicate synchronized 5G signals from the donor radio antenna 106 to one or more indoor relay devices (e.g., the indoor relay devices 104A, 104B, 104C, . . . , 104N) for the indoor distribution of the synchronized 5G signals to serve one or more indoor UEs 114, based on the captured and decoded publicly broadcast synchronization signals. In this entire process, i.e., the capture, the decoding, the synchronization, and the communication of the synchronized 5G signals for the indoor distribution of the synchronized 5G signals, may be independent of any additional signaling and explicit coordination from the outdoor 5G RAN node (e.g., the first outdoor 5G RAN node 116A). The first repeater device 102A autonomously captures and processes publicly broadcast synchronization signals, ensuring that the indoor distribution of synchronized 5G signals operates seamlessly without requiring coordination from the outdoor 5G RAN node. This autonomy enhances the efficiency and reliability of the indoor 5G signal distribution, making it robust and adaptable to changing conditions without relying on external network coordination. The repeater system 102 does not require any coordination with the gNB, such as the outdoor 5G RAN node, or the one or more indoor UEs 114, which makes it more flexible and easier to deploy as compared to conventional systems including IAB systems. The repeater system 102 leverages only public broadcast signals to achieve synchronization and beam management, which makes it more secure and less susceptible to interference. Further, the repeater system 102 achieves synchronization and beam management transparently, which means that the UEs, such as the one or more indoor UEs 114, do not need to be aware of the presence of the repeater system 102. The use of public signals, i.e., the publicly broadcast synchronization signals, allows the repeater system 102 to relay data to UEs, such as the one or more indoor UEs 114, without knowledge of encryption keys or direct feedback from the UEs. Beneficially, the first repeater device 102A significantly improves the data throughput rate and SNR of the one or more indoor UEs 114 connected to the first repeater device 102A. Thus, the first repeater device 102A of the repeater system 102 not only achieves cell center like performance even in the cell edge areas but also ensures a seamless connectivity as well as the QoE without increasing the telecommunications infrastructure cost.

In accordance with an embodiment, the plurality of indoor relay devices 104 may be disposed at a plurality of different locations in an indoor area 112. The plurality of indoor relay devices 104 may be wirelessly connected to each other in a 5G wireless mesh network configuration such that the synchronized 5G signals may be distributed from the donor radio antenna 106 to the one or more indoor relay devices (e.g., the indoor relay devices 104A and 104B) and further from the one or more indoor relay devices to other indoor relay devices (e.g., the indoor relay devices 104C, . . . , 104BN) to extend coverage in the indoor area 112. Each indoor relay device of the plurality of indoor relay devices 104 may be configured to execute time and frequency synchronization with the first repeater device 102A to serve its own set of target UEs. Each indoor relay device in this mesh network is specifically designed to establish time and frequency synchronization with the first repeater device 102A. This synchronization enables each relay device to effectively serve its own set of target UEs, ensuring that the 5G signals are accurately distributed and coverage is seamlessly extended throughout the indoor area 112.

In accordance with an embodiment, the controller 108 may be further configured to self-configure its beam configurations communicated from the relay radio antenna 110 to the one or more indoor UEs 114 directly or via the one or more indoor relay devices (e.g., the indoor relay devices 104A, 104B, 104C, . . . , 104N), based on information related to the one or more indoor UEs 114 captured from the outdoor 5G RAN node (e.g., the first outdoor 5G RAN node 116A). The mmWave communication between the one or more indoor UEs 114 and the outdoor 5G RAN node (e.g., the first outdoor 5G RAN node 116A) may be through the repeater system 102. The controller 108 may be configured to perform beam management by using the Demodulation Reference Signal (DMRS) signal from the outdoor 5G RAN node (e.g., the gNB). The DMRS signal may be a short signal that is transmitted by the outdoor 5G RAN node (e.g., the gNB) to each UE, such as the one or more indoor UEs 114. The controller 108 may use the DMRS signal to estimate the channel conditions between the first repeater device 102A and each UE without the need for having a direct feedback from each UE. This information is then used to select the optimal beam for each UE of the one or more indoor UEs 114.

In accordance with an embodiment, the communication of the synchronized 5G signals to the one or more indoor relay devices (e.g., the indoor relay devices 104A, 104B, 104C, . . . , 104N) may be a transparent relaying comprising decoding of Physical Downlink Control Channel (PDCCH) signals from the outdoor 5G RAN node (e.g., the first outdoor 5G RAN node 116A) during a communication session. The transparent relaying further comprises extracting beam configuration commands intended for each target UE of the one or more indoor UEs 114 based on the decoding of the PDCCH signals and re-configuring its own access beams from the relay radio antenna 110 to match UE directions of the one or more indoor UEs 114 commanded by the outdoor 5G RAN node (e.g., the first outdoor 5G RAN node 116A) independent of the additional signaling and the explicit coordination from the outdoor 5G RAN node (e.g., the first outdoor 5G RAN node 116A).

In accordance with an embodiment, in the process of decoding the Physical Downlink Control Channel (PDCCH), the controller 108 may be further configured to perform a set of operations. The set of operations include initiating the decoding by considering multiple possible Radio Network Temporary Identifiers (RNTI) values. For each RNTI hypothesis, the controller 108 may be configured to first descramble the PDCCH bits using the corresponding RNTI scrambling sequence. Scrambling refers to a process where the bits are mixed with a predefined sequence to prevent unauthorized decoding. Following descrambling, the controller 108 may performs channel decoding on the descrambled bits. This channel decoding involves using known techniques such as convolutional coding, turbo coding, or Low-Density Parity-Check (LDPC) coding. These coding schemes help correct errors introduced during the transmission of the PDCCH. After channel decoding, the controller 108 may be configured to check the Cyclic Redundancy Check (CRC) against the hypothesized RNTI. The CRC is a type of error-checking code. If the CRC verification passes, it indicates that the correct RNTI has been found, and the PDCCH has been successfully decoded for that specific RNTI hypothesis.

In accordance with an embodiment, on successful decoding of the Physical Downlink Control Channel (PDCCH), the controller 108 may be configured to retrieve scheduling information for each scheduled UE of the one or more UEs 114. The decoded PDCCH comprises details including the Radio Network Temporary Identifier (RNTI) and resource grants specific to each scheduled UE. The controller 108 then extracts and stores key parameters associated with the scheduling information. This includes, but is not limited to, the UE ID (identification), the assignment of resource blocks, the chosen modulation and coding scheme, and other relevant grant parameters. This process ensures that, after successful decoding, the controller 108 may have access to comprehensive information about the scheduled UEs and their respective resource allocations. The extracted data is stored for subsequent actions, such as configuring the communication parameters for each UE, optimizing resource usage, and facilitating efficient data transmission in the network.

In accordance with an embodiment, with the aid of the Radio Network Temporary Identifier (RNTI) and grant information obtained from the scheduling process, the controller 108 may be configured to correlate various Channel State Information Reference Signals (CSI-RS) resources to the currently active UEs of the one or more indoor UEs 114. This correlation may associate the specific CSI-RS resources with the UEs that have been scheduled for communication. Subsequently, the controller 108 may conduct measurements on the reference signals associated with each UE. This involves averaging out noise by accumulating signals over multiple CSI-RS periods. By doing so, the repeater system 102 aims to enhance the reliability and accuracy of the measurements, providing a more robust representation of the channel conditions for each UE.

In accordance with an embodiment, based on the Channel State Information Reference Signals (CSI-RS) measurements, the controller 108 may be configured to estimate the channel matrix corresponding to each UE of the one or more indoor UEs 114. Subsequently, the controller 108 may be configured to compute a beamforming precoding matrix or beamforming vector, optimizing the directional transmission of signal power toward the identified UE. This beamforming vector may be dynamically updated in each CSI-RS period to adapt to the changing characteristics of the channel. Through this process, the controller 108 optimizes the beamforming based on real-time channel information, ensuring efficient and adaptive communication with each UE of the one or more indoor UEs 114.

In accordance with an embodiment, the controller 108 may be further configured to determine a path loss to each

US 12,634,000 B2

13 / 14

UE of the one or more indoor UEs 114 based on Channel State Information Reference Signals (CSI-RS) channel independent of the explicit coordination from the outdoor 5G RAN node (e.g., the first outdoor 5G RAN node 116A). The controller 108 may be further configured to adjust transmit power from the relay radio antenna 110 and each of a plurality of indoor relay devices 104 based on the determined path loss. Based on the Channel State Information Reference Signals (CSI-RS), the controller 108 may be configured to estimate the propagation path loss by analyzing the received power levels of reference signals. This path loss estimate serves in determining the optimal transmit power needed to reach the specific UE of the one or more indoor UEs 114. The calculated transmit power accounts for the effects of signal attenuation and helps ensure that the signal reaches the UE with the required quality. Such path loss estimate may be updated in each CSI-RS period, aligning with the dynamic adjustments made during beamforming calculations. This iterative process ensures that the transmit power is continually optimized based on real-time channel conditions, contributing to efficient and adaptive wireless communication by the repeater system 102.

In accordance with an embodiment, based on the decoded publicly broadcast synchronization signals, for example, after successfully decoding the Physical Downlink Control Channel (PDCCH) grants, the controller 108 may be configured to determine which UEs of the one or more indoor UEs 114 have Physical Downlink Shared Channel (PDSCH) allocations in the upcoming time slots. As the outdoor 5G RAN node (e.g., gNB) transmits PDSCH as public information to a UE, it precedes the transmission with a Demodulation Reference Signal (DMRS) preamble on the same beam. The controller 108 may isolate the DMRS signal based on the UE's PDSCH allocation information obtained from the PDCCH. Subsequently, the controller 108 may be configured to correlates this DMRS measurement with the Channel State Information Reference Signals (CSI-RS) to precisely estimate the optimal beam. This refined beam selection, performed right before the reception of PDSCH, allows for precise electronic steering of the beam to effectively receive the PDSCH signal. Notably, the same transmission beam may be then employed by the controller 108 to relay the PDSCH data to the designated UE. This process, utilizing DMRS signals, enhances beamforming accuracy and ensures efficient and reliable data transfer in the repeater system 102 for wireless communication.

In accordance with an embodiment, the controller 108 may be configured to monitor channel quality over time by tracking reference signals like CSI-RS and DMRS for each UE of the one or more UEs 114. The channel measurements may be used to generate a channel estimate H for each UE referred to as "u". In this case, $H_u = Y/X$, in which Y is the received signal, X is the reference signal. The beamforming vector may be computed based on $H_u$ using singular value decomposition, known in the art. The beamforming vector may be updated every CSI-RS period based on the latest channel estimate, ensuring that the beamforming adapts to changing channel conditions over time.

In accordance with an embodiment, the path loss may be estimated from channel measurements. Subsequently, the transmit power may be dynamically adjusted by the controller 108 based on the estimated path loss. This adaptive approach ensures that the transmit power is continually optimized in response to changing channel conditions and signal attenuation of 5G signals, enhancing the efficiency and reliability of the outdoor to indoor 5G signals distribution.

In accordance with an embodiment, the controller 108 may be further configured to perform frequency or spatial isolation to reduce interference between UEs of the one or more indoor UEs 114 independent of the explicit coordination from the outdoor 5G RAN node (e.g., the first outdoor 5G RAN node 116A). In a multi-user scenario, the controller 108 may be further configured to employs a series of steps to support multiple users, such as the one or more UE 14. The decoding of Physical Downlink Control Channel (PDCCH) may identify the scheduled UEs and their respective allocations. Further, the Channel State Information Reference Signals (CSI-RS) and Demodulation Reference Signals (DMRS) may be correlated to each UE of the one or more indoor UEs 114 based on the identified allocations from PDCCH decoding. These two operations may be repeated for each UE in the repeater system 102, resulting in the computation of individual beamforming vectors and power control parameters. To manage inter-UE interference, the controller 108 may be configured to utilize the frequency and spatial isolation, along with scheduling coordination. These measures help mitigate potential conflicts and optimize the use of resources in a multi-user environment, ensuring efficient and reliable communication for each scheduled UE of the one or more indoor UEs 114.

In accordance with an embodiment, the controller 108 may be further configured to select a first operational mode when only publicly broadcasted information from the outdoor 5G RAN node (e.g., the first outdoor 5G RAN node 116A) to the one or more indoor UEs 114 is to be decoded, and wherein the publicly broadcasted information does not include user data. In the first operational mode, the information being decoded is limited to what is publicly broadcasted and does not include user-specific data. By excluding user data from the decoding process, it reduces the computational load on the controller 108 and helps streamline the processing of non-private information for efficient operation in scenarios where user-specific details are not immediately required. This adaptability in operational modes allows the system to efficiently manage its resources based on the nature of the information being processed.

In accordance with an embodiment, the controller 108 may be further configured to select a second operational mode when publicly broadcasted information from the outdoor 5G RAN node (e.g., the first outdoor 5G RAN node 116A) to the one or more indoor UEs 114 as well as information from the one or more indoor UEs 114 to the outdoor 5G RAN node (e.g., the first outdoor 5G RAN node 116A) are to be decoded. The controller 108 has the capability to switch to the second operational mode under different conditions. Specifically, this mode is selected when the task involves decoding not only publicly broadcasted information from the outdoor 5G RAN node (e.g., the first outdoor 5G RAN node 116A) to the one or more indoor UEs 114 but also information from the one or more indoor UEs 114 back to the outdoor 5G RAN node. This mode may be utilized when there is a need for more comprehensive communication, involving user-specific data or responses from the indoor UEs to the outdoor network. The flexibility in operational modes allows the system to adapt its decoding capabilities based on the nature of the communication requirements at any given time. For example, an indoor UE may provide feedback on the quality of their connection, indicating if they are experiencing issues like low signal strength or high latency. Decoding this feedback allows the first repeater device to identify and address potential service quality issues. In another example, the indoor UE may need to send requests for specific resources or services, such as increased bandwidth for a particular application. Decoding this information may be useful to allocate resources efficiently and meet user demands.

In accordance with an embodiment, the central cloud server 120 may be configured to communicate over an out-of-band frequency with the first repeater device 102A and the plurality of indoor relay devices 104 to form and monitor the 5G wireless mesh network. The first repeater device 102A and the plurality of indoor relay nodes 104 may form the 5G wireless mesh network. Each of the first repeater device 102A and the plurality of indoor relay nodes 104 may be connected with each other and may form a backhaul, such as mmWave backhaul. In an implementation, utilizing mmWave for backhaul has advantages such as higher data transfer rates and increased bandwidth, making it well-suited for the demands of 5G networks. This design enables efficient and high-capacity communication between the nodes, contributing to the overall performance and reliability of the 5G wireless mesh network.

In accordance with an embodiment, the central cloud server 120 may be further configured to acquire network traffic statistics and performance metrics of each indoor relay device in the 5G wireless mesh network configuration. To comprehensively assess and manage the 5G wireless mesh network, acquiring network traffic statistics and performance metrics from each indoor relay device may be useful. This involves monitoring parameters such as throughput to gauge data transmission efficiency, latency for network responsiveness, packet loss and error rates to ensure reliability, signal strength, and link quality for robust connectivity, bandwidth utilization to optimize resource allocation, connection stability to identify potential disruptions, device load for efficient resource management, and a current network path to reach to the one or more indoor UEs 114, for example, a sequence of indoor relay nodes used, to detect bottlenecks. Security metrics may be monitored to ensure the effectiveness of protocols, and energy consumption may be evaluated for sustainable operation. This continuous monitoring allows the central cloud server 120 to make informed decisions, proactively optimizing the network's performance based on real-time insights into its health and efficiency.

In accordance with an embodiment, the central cloud server 120 may be further configured to dynamically anticipate a traffic load and a bandwidth demand per zone served by each indoor relay device based on the acquired network traffic statistics and performance metrics. This capability addresses the dynamic nature of network usage. By proactively anticipating traffic loads and bandwidth demands, the central cloud server 120 may optimize the network's configuration in advance, ensuring that it can effectively handle the varying needs of different zones. The central cloud server 120 achieves this by leveraging the acquired network traffic statistics and performance metrics. These metrics may provide insights into the current network conditions, allowing the central cloud server 120 to predict potential future demands. Using this information, the central cloud server 120 can dynamically assess the expected traffic load and bandwidth demand for each specific zone (a physical area having specific number of indoor UEs) served by each indoor relay device.

In accordance with an embodiment, the central cloud server 120 may be further configured to re-configure the 5G wireless mesh network to proactively mitigate the anticipated traffic load and the bandwidth demand per zone. The central cloud server 120 may perform proactive mitigation, which involves a continual cycle of data analysis and dynamic adjustments to the 5G wireless mesh network. By analyzing real-time network traffic statistics and performance metrics from each indoor relay device, the central cloud server 120 may anticipate traffic loads and bandwidth demands for specific zones. Leveraging this insight, it dynamically reconfigures the network, adjusting resource allocations, optimizing bandwidth utilization, and potentially reallocating relay devices to meet expected demand. Load balancing techniques are employed to evenly distribute traffic, and parameters such as transmit power and routing paths are optimized. For example, routing may be changed from: the first repeater device 102A to the indoor relay device 104A and further to the indoor relay device 104B to the first repeater device 102A to the indoor relay device 104C and further to the indoor relay device 104N. This real-time adaptation, coupled with a feedback loop that refines predictions, ensures that the network proactively mitigates anticipated traffic loads, providing efficient and reliable service tailored to the evolving needs of each zone with the indoor area 112.

In accordance with an embodiment, the re-configuration of the 5G wireless mesh network configuration may comprise an antenna re-configuration of an indoor relay device to adjust beamforming settings and Multiple-Input, Multiple-Output (MIMO) configurations. This operation may optimize the beamforming settings and Multiple-Input, Multiple-Output (MIMO) configurations. By reconfiguring the antenna settings, a given indoor relay device of the plurality of indoor relay device 104 may dynamically adapt its beamforming, the technique that focuses signal transmission in specific directions, and MIMO configurations, which involve using multiple antennas for simultaneous communication. This adaptive approach enables the network to efficiently utilize spatial diversity, improving signal strength, reducing interference, and enhancing overall data transfer performance based on the dynamically changing demands and conditions within the indoor area 112 for consistent high throughput communication within the 5G wireless mesh network.

In accordance with an embodiment, the re-configuration of the 5G wireless mesh network configuration may further comprise performing carrier aggregation by concurrently using a plurality of frequency bands to increase data rates in one or more affected zones in which the traffic load and bandwidth demand are anticipated. This operation may comprise concurrent utilization of multiple frequency bands to enhance data rates, particularly in zones where anticipated traffic load and bandwidth demand are high. By aggregating carriers across different frequency bands, the network may increase its overall bandwidth capacity, enabling higher data rates and improving the network's ability to meet the demands of data-intensive applications and user activities. This dynamic adjustment may be particularly beneficial in zones where a surge in usage is anticipated, allowing the network to efficiently allocate resources and optimize data transfer performance.

In accordance with an embodiment, the re-configuration of the 5G wireless mesh network configuration may further comprise identifying one or more alternative connectivity paths among the plurality of indoor relay devices 104 to proactively mitigate the anticipated traffic load and bandwidth demand in the one or more affected zones. For example, one path may be the first repeater device 102A to the indoor relay device 104A and further to the indoor relay device 104B. Another path may be the first repeater device 102A to the indoor relay device 104C and further to the indoor relay device 104N. The central cloud server 102 may be further configured to dynamically switch from the primary communication path to the identified one or more alternative communication paths within a threshold time (e.g., less than 100 milliseconds) to maintain continuity in the service to the one or more indoor UEs 114 for the uplink and downlink communication in the indoor area 112. The signal blockage or the presence of a signal obstruction in the primary communication path or anticipated traffic load may be known to the central cloud server 102 based on the periodic information received from at least each of the plurality of indoor relay devices 104. Thus, the primary communication path may be made dormant, and the secondary or an alternative communication path may be made active. The path recovery may be autonomously triggered locally at the concerned indoor relay device (e.g., the indoor relay device 104B) or may be directed from the central cloud server 102. In an implementation, the switching event may be executed via a management plane, where the switching event may be controlled by the central cloud server 102.

In accordance with an embodiment, the controller 108 may be further configured to concurrently capture: (a) a first set of RF signals from the first outdoor 5G RAN node 116A associated with the first WCN 118A via a first set of channels, and (b) a second set of RF signals from the second outdoor 5G RAN node 116B associated with the second WCN 118B. Thus, the one or more indoor UEs 114 may choose service of either the first WCN 118A or the second WCN 118B. In other words, in this embodiment, the repeater system 102 may handle multiple WCNs concurrently and share its resources with the first WCN 118A and the second WCN 118B.

Figure 3:
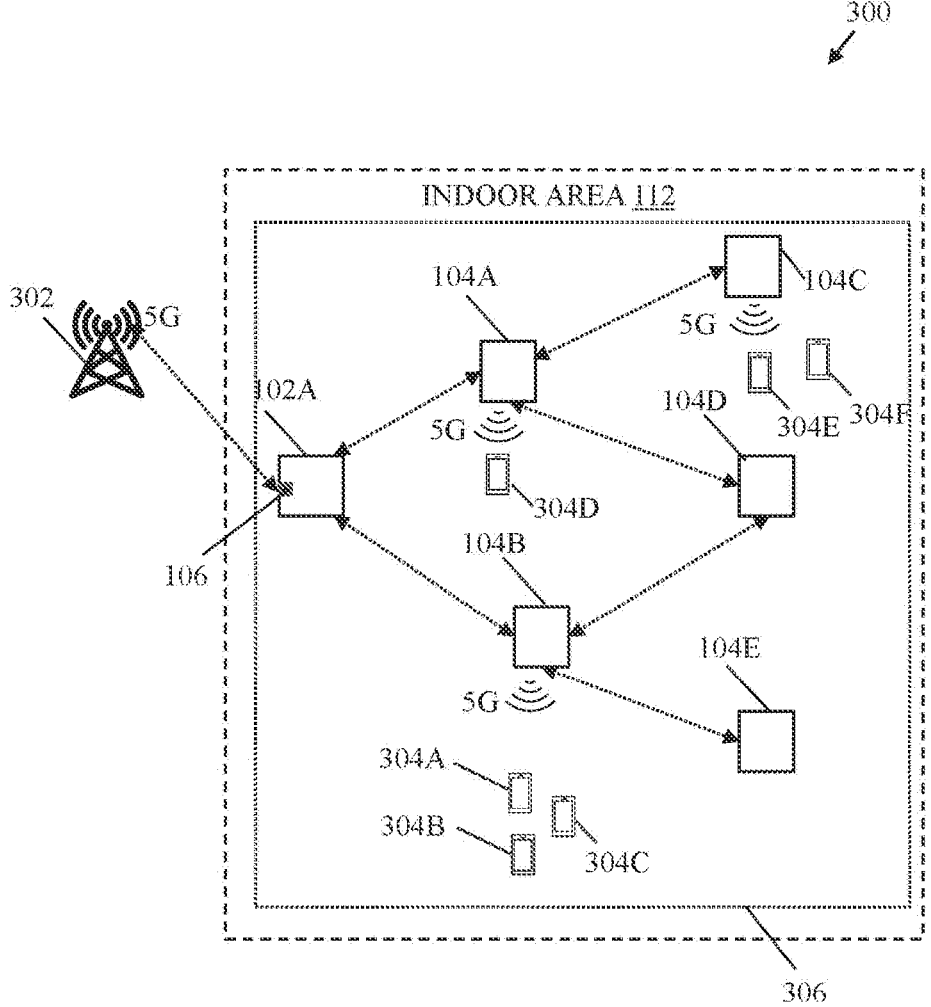
FIG. 3 is a diagram illustrating an exemplary implementation of a repeater system with a first repeater device and indoor relay devices for indoor distribution of cellular mm Wave signals, in accordance with another exemplary embodiment of the disclosure.
Figure 4C:
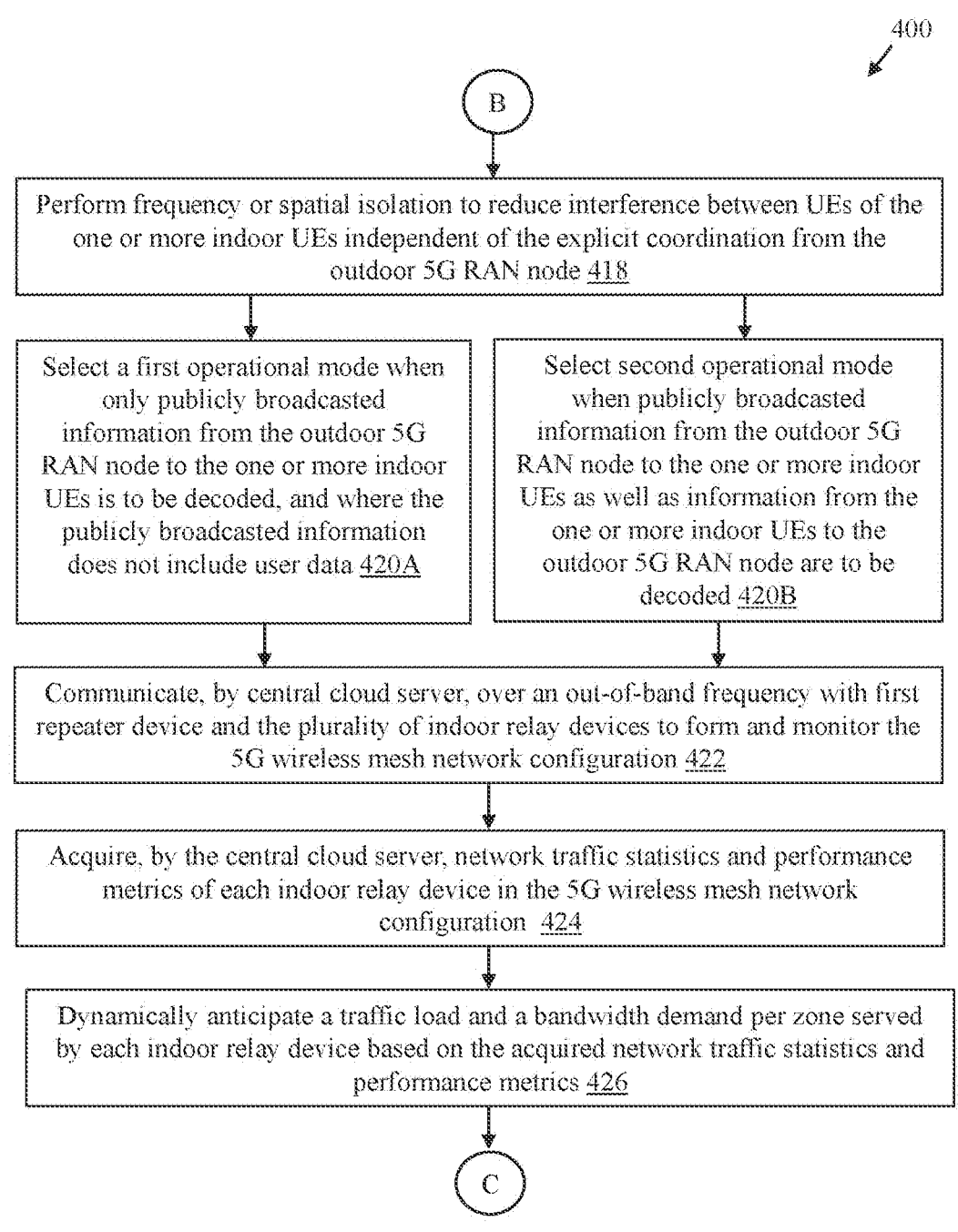

FIG. 3 is a diagram illustrating an exemplary implementation of a repeater system with a first repeater device and indoor relay devices for indoor distribution of cellular mm Wave signals, in accordance with another exemplary embodiment of the disclosure. FIG. 3 is explained in conjunction with elements from FIGS. 1 and 2. With reference to FIG. 3, there is shown the repeater system 102 of FIG. 1, in which the first repeater device 102A is communicatively coupled to the outdoor 5G RAN node 302 (e.g., a gNB) and the donor radio antenna 106 of the first repeater device 102A may be configured to capture publicly broadcast synchronization signals from the outdoor 5G RAN node 302. The indoor relay devices 304A to 304F may be disposed at a plurality of different locations in an indoor area 112, where the indoor relay devices 304A to 304F may be wirelessly connected to each other in a 5G wireless mesh network configuration 306 such that the synchronized 5G signals are distributed from the donor radio antenna 106 to the indoor relay devices 304A and 304B and further from the indoor relay devices 304A to other indoor relay devices 304C, 304D, 304E, and 304F to extend 5G coverage in the indoor area 112. Each indoor relay device may be configured to execute time and frequency synchronization with the first repeater device 102A to serve its own set of target UEs.

The first repeater device 102A may be configured to decode the publicly broadcast synchronization signals from the outdoor 5G RAN node 302 captured by the donor radio antenna 106 and synchronize with the decoded publicly broadcast synchronization signals to align a frame structure of donor radio antenna 106 to the frame structure of the outdoor 5G RAN node 302. The first repeater device 102A may include one or more relay radio antennas (e.g., two relay antennas or an array of antennas) configured to communicate synchronized 5G signals from the donor radio antenna 106 to the indoor relay devices 304A to 304F for the indoor distribution of the synchronized 5G signals to serve indoor UEs 304A to 304F, based on the captured and decoded publicly broadcast synchronization signals.

When a conventional repeater system is placed inside a building, it can experience additional losses due to absorption, reflection, and scattering. This can reduce the signal strength, leading to a reduction in the overall link budget. Further, a conventional 5G Integrated Access and Backhaul (IAB) systems may be used, but conventional 5G IAB systems face technical challenges related to coordination, complexity, cost, and adaptability. For example, standard 5G IAB systems require extensive coordination with gNodeBs (gNBs) and user equipment (UEs) to achieve synchronization. This coordination can introduce delays and complexity into the network setup. Further, similar to synchronization, beam management in a standard 5G IAB relies on coordination with gNBs and UEs. This coordination is necessary to determine the optimal beam for each UE, but it can also lead to increased signaling overhead and potential delays. Furthermore, standard 5G IAB systems may not operate as standalone repeaters.

In contrast to the conventional systems, the repeater system 102 which includes the first repeater device 102A and the indoor relay devices 304A to 304F, overcomes path loss and expands indoor coverage of cellular mm Wave signals, i.e., outdoor-to-indoor (O2I) distribution of fifth generation (5G) signals without introduce delays and complexity into the network setup. It means that the indoor distribution of synchronized 5G signals can be achieved without relying on external control, making the system more robust and adaptable to different outdoor network configurations and changes. Thirdly, by capturing, decoding, and synchronizing with publicly broadcast synchronization signals, the repeater system 102 ensures that the indoor distribution of synchronized 5G signals is precise and reliable without adding any extra layer of additional signaling and associated complexity. This technical advantage results in improved indoor network coverage of 5G signals and performance, enhancing the quality of service for indoor users without introducing unnecessary complexity and delays.

In accordance with an embodiment, the first repeater device 102A transparently relays all PDCCH signalling from the outdoor 5G RAN node 302 (i.e., the gNB) during the beam management process i.e., during initial synchronization, during initial access, during beam refinement, and during beam tracking. From each PDCCH, the first repeater device 102A may be configured to extract beam command meant for the indoor UEs 304A to 304F. The first repeater device 102A may apply the same beam configuration for its own access beam to the UEs it may serve or direct the indoor relay devices 304A to 304F to apply the same beam configuration for their own access beam to their respective UEs. Thus, the first repeater device 102A and each of the indoor relay devices 304A to 304F beams align with their respective UEs without any explicit gNB coordination. The repeater system 102 leverages standard 5G NR beam management signals from the outdoor 5G RAN node 302 (i.e., the gNB) to align its own access beams with the UEs, without requiring any UE awareness or additional signaling from the gNB. This allows simple plug-and-play deployment.

In accordance with an embodiment, this transparent beam management approach works in a fixed repeater system 102 scenario because of the following reasons:

a. The first repeater device 102A acts like a normal UE for initial access, so no special procedures needed during initial access.

b. The SSB, CSI-RS, RACH channels used for initial access are typically designed to be detectable by any UE, including the first repeater device 102A.

c. The PDCCH sent from gNB to UE may schedule resources for a UE and configures the UE's beam direction. The first repeater device 102A can receive and decode all PDCCHs from the gNB in promiscuous mode, since it relays them anyway.

e. From each PDCCH, the first repeater device 102A can extract the beam configuration commands intended for the target UE. Since the first repeater device 102A access link is fixed, aligning its beam to match the UE's configured beam may be efficient.

g. The first repeater device 102A may have the advantage of also reading the UE's PUCCH feedback on best RF beams, allowing joint optimization.

h. No coordination between gNB and the first repeater device 102A may be needed because the first repeater device 102A directly leverages the standard 5G New radio (NR) signals.

i. The outdoor 5G RAN node 302 (i.e., the gNB) may treat the first repeater device 102A and UEs as separate UEs for scheduling and beam configuration.

Thus, the first repeater device 102A may act as a "silent partner" that relies on the existed NR beam management procedures between gNB and UEs without the need for additional signalling and explicit coordination with the outdoor 5G RAN node 302 (i.e., the gNB). By choosing beams aligned with the UEs, the first repeater device 102A benefits without any explicit participation by the gNB.

In an example, in conventional systems, in the known 5G standard, typically the gNB would need to send additional signaling to the conventional IAB in order to tell it how to align its beams with the UEs. This would require additional complexity and could introduce latency. The conventional IAB would then need to send the gNB an acknowledgement that it has received the beam configuration and the like. This additional signaling would add complexity to the system and could introduce latency. It would also require the conventional IAB to be aware of the gNB's beam management signaling, which would make it more difficult to deploy the conventional IAB in a plug-and-play fashion. In contrast to the conventional systems, the first repeater device 102A extracts such information from the PDCCH signaling that is already being sent to the indoor UEs by the gNB. This eliminates the need for the gNB to send additional signaling to the first repeater device 102A, which simplifies the system and reduces latency.

FIGS. 4A, 4B, 4C, and 4D collectively is a diagram illustrating an exemplary method for indoor distribution of cellular mmWave signals, in accordance with an embodiment of the disclosure. FIGS. 4A, 4B, 4C, and 4D are explained in conjunction with elements from FIGS. 1, 2, and 3. With reference to FIGS. 4A, 4B, 4C, and 4D, there is shown a flowchart 400 comprising exemplary operations 402 to 428. The operations 402 to 428 may be implemented in the repeater system 102.

At 402, publicly broadcast synchronization signals from an outdoor 5G RAN node, such as the first outdoor 5G RAN node 116A may be captured by the donor radio antenna 106 of the first repeater device 102A. The operation 402 may include one or more sub-operations such as operation 402A. At 402A, a 5G NR frequency spectrum may be scanned using a Fast Fourier Transform (FFT) operation with variable FFT size to adapt to different Synchronization Signal Block (SSB) signal power levels to detect any SSB transmissions from the outdoor 5G RAN node (e.g., the first outdoor 5G RAN node 116A).

At 404, the publicly broadcast synchronization signals from the outdoor 5G RAN node captured by the donor radio antenna 106, may be decoded. The controller 108 may be further configured to decode the publicly broadcast synchronization signals from the outdoor 5G RAN node (e.g., the first outdoor 5G RAN node 116A) captured by the donor radio antenna 106. The operation 404 may include one or more sub-operations such as operations 404A, 404B, and 404C.

At 404A, Physical Broadcast Channel (PBCH) may be decoded in Synchronization Signal Block (SSB) to acquire cell identity and confirm that the SSB is from a target gNodeB to which the repeater system is to be synchronized, wherein the target gNodeB is the outdoor 5G RAN node (e.g., the first outdoor 5G RAN node 116A).

At 404B, Physical Downlink Control Channel (PDCCH) signals may be decoded from the outdoor 5G RAN node (e.g., the first outdoor 5G RAN node 116A) during a communication session.

At 404C, beam configuration commands intended for each target UE of the one or more indoor UEs 114 may be extracted based on the decoding of the PDCCH signals.

At 406, the first repeater device 102A may be synchronized with the decoded publicly broadcast synchronization signals to align a frame structure of donor radio antenna 106 to the frame structure of the outdoor 5G RAN node (e.g., the first outdoor 5G RAN node 116A). The controller 108 may be further configured to synchronize with the decoded publicly broadcast synchronization signals. The operation 406 may include one or more sub-operations such as operation 406A, 406B, and 406C.

At 406A, time and frequency synchronization to the outdoor 5G RAN node (e.g., the first outdoor 5G RAN node 116A) may be executed based on decoding of synchronization signal blocks without the explicit coordination from the outdoor 5G RAN node (e.g., the first outdoor 5G RAN node 116A).

At 406B, a carrier frequency offset (CFO) may be estimated by analyzing synchronization signal blocks signal's phase rotation in a frequency domain in the frequency synchronization.

At 406C, it may be compensated for the CFO in the local oscillator 208 to align the first repeater device 102A to a carrier frequency of the outdoor 5G RAN node (e.g., the first outdoor 5G RAN node 116A).

At 408, synchronized 5G signals from the donor radio antenna 106 may be communicated by the relay radio antenna 110 to one or more indoor relay devices (e.g., the indoor relay devices 104A, 104B, 104C, ... , 104N) for the indoor distribution of the synchronized 5G signals to serve one or more indoor UEs 114, based on the captured and decoded publicly broadcast synchronization signals. Herein, the capture, the decoding, the synchronization, and the communication of the synchronized 5G signals for the indoor distribution of the synchronized 5G signals, may be independent of any additional signaling and explicit coordination from the outdoor 5G RAN node (e.g., the first outdoor 5G RAN node 116A).

At 410, access beams from the relay radio antenna 110 may be re-configured to match UE directions of the one or more indoor UEs 114 commanded by the outdoor 5G RAN node (e.g., the first outdoor 5G RAN node 116A) independent of the additional signaling and the explicit coordination from the outdoor 5G RAN node (e.g., the first outdoor 5G RAN node 116A).

At 412, beam configurations communicated from the relay radio antenna 110 to the one or more indoor UEs 114 directly or via the one or more indoor relay devices (e.g., the indoor relay devices 104A, 104B, 104C, . . . , 104N) may be self-configured, based on information related to the one or more indoor UEs 114 captured from the outdoor 5G RAN node (e.g., the first outdoor 5G RAN node 116A). The mmWave communication between the one or more indoor UEs 114 and the outdoor 5G RAN node (e.g., the first outdoor 5G RAN node 116A) may be through the repeater system 102.

In accordance with an embodiment, the plurality of indoor relay devices 104 may be disposed at a plurality of different locations in an indoor area 112. The plurality of indoor relay devices 104 may be wirelessly connected to each other in a 5G wireless mesh network configuration such that the synchronized 5G signals may be distributed from the donor radio antenna 106 to the one or more indoor relay devices (e.g., the indoor relay devices 104A and 104B) and further from the one or more indoor relay devices to other indoor relay devices (e.g., the indoor relay devices 104C, . . . , 104BN) to extend coverage in the indoor area 112. Each indoor relay device of the plurality of indoor relay devices 104 may be configured to execute time and frequency synchronization with the first repeater device 102A to serve its own set of target UEs.

At 414, a path loss to each UE of the one or more indoor UEs 114 may be determined based on Channel State Information Reference Signals (CSI-RS) channel independent of the explicit coordination from the outdoor 5G RAN node (e.g., the first outdoor 5G RAN node 116A).

At 416, transmit power from the relay radio antenna 110 and each of a plurality of indoor relay devices 104 may be adjusted based on the determined path loss.

At 418, frequency or spatial isolation may be performed to reduce interference between UEs of the one or more indoor UEs 114 independent of the explicit coordination from the outdoor 5G RAN node (e.g., the first outdoor 5G RAN node 116A).

At 420A, a first operational mode may be selected when only publicly broadcasted information from the outdoor 5G RAN node (e.g., the first outdoor 5G RAN node 116A) to the one or more indoor UEs 114 is to be decoded, and where the publicly broadcasted information does not include user data.

At 420B, a second operational mode may be selected when publicly broadcasted information from the outdoor 5G RAN node (e.g., the first outdoor 5G RAN node 116A) to the one or more indoor UEs 114 as well as information from the one or more indoor UEs 114 to the outdoor 5G RAN node (e.g., the first outdoor 5G RAN node 116A) are to be decoded.

At 422, the central cloud server 120 may communicate over an out-of-band frequency with the first repeater device 102A and the plurality of indoor relay devices 104 to form and monitor the 5G wireless mesh network configuration.

At 424, network traffic statistics and performance metrics of each indoor relay device in the 5G wireless mesh network configuration may be acquired by the central cloud server 120.

At 426, a traffic load and a bandwidth demand per zone served by each indoor relay device may be dynamically anticipated based on the acquired network traffic statistics and performance metrics.

At 428, the 5G wireless mesh network may be re-configured by the central cloud server 120 to proactively mitigate the anticipated traffic load and the bandwidth demand per zone. The operation 428 may include one or more sub-operations, such as operations 428A, 428B, and 428C. At 428A, an antenna re-configuration of an indoor relay device may be performed to adjust beamforming settings and Multiple-Input, Multiple-Output (MIMO) configurations. At 428B, carrier aggregation may be performed by concurrently using a plurality of frequency bands to increase data rates in one or more affected zones in which the traffic load and bandwidth demand are anticipated. At 428C, one or more alternative connectivity paths may be identified among the plurality of indoor relay devices 104 to proactively mitigate the anticipated traffic load and bandwidth demand in the one or more affected zones.

Various embodiments of the disclosure may provide a non-transitory computer-readable medium having stored thereon computer implemented instructions that when executed by a computer causes a communication system (e.g., the repeater system 102) to execute operations, the operations comprising capturing, by a donor radio antenna 106 of a first repeater device 102A, publicly broadcast synchronization signals from an outdoor 5G Radio Access Network (RAN) node; decoding, by a controller 108 of the first repeater device 102A, the publicly broadcast synchronization signals from the outdoor 5G RAN node (e.g., the first outdoor 5G RAN node 116A) captured by the donor radio antenna 106; synchronizing, by the controller 108, with the decoded publicly broadcast synchronization signals to align a frame structure of donor radio antenna 106 to the frame structure of the outdoor 5G RAN node (e.g., the first outdoor 5G RAN node 116A); and communicating, by a relay radio antenna 110 of the first repeater device 102A, synchronized 5G signals from the donor radio antenna 106 to one or more indoor relay devices (e.g., the indoor relay devices 104A, 104B, 104C, . . . , 104N) for the indoor distribution of the synchronized 5G signals to serve one or more indoor user equipment (UEs), based on the captured and decoded publicly broadcast synchronization signals, wherein the capturing, the decoding, the synchronizing, and the communicating of the synchronized 5G signals for the indoor distribution of the synchronized 5G signals, are independent of any additional signaling and explicit coordination from the outdoor 5G RAN node (e.g., the first outdoor 5G RAN node 116A).

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g., computer readable code, program code, and/or instructions disposed in any form, such as source, object, or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

What is claimed is:

1. A repeater device, comprising:
a donor radio antenna configured to capture publicly broadcast synchronization signals from an outdoor 5G Radio Access Network (RAN) node;
a controller configured to:
decode the captured publicly broadcast synchronization signals from the outdoor 5G RAN node; and
synchronize with the decoded publicly broadcast synchronization signals to align a frame structure of the donor radio antenna to a frame structure of the outdoor 5G RAN node,
wherein the synchronization with the decoded publicly broadcast synchronization signals is independent of additional signaling and explicit coordination from the outdoor 5G RAN node; and
a relay radio antenna configured to communicate the synchronized publicly broadcast synchronization signals to a first set of indoor relay devices among a plurality of indoor relay devices, based on the decoded publicly broadcast synchronization signals,
wherein the controller is further configured to execute frequency or spatial isolation, to reduce interference between user equipment (UEs) of one or more indoor UEs associated with the outdoor 5G RAN node, independent of the explicit coordination from the outdoor 5G RAN node.

2. The repeater device according to claim 1, wherein the synchronization with the decoded publicly broadcast synchronization signals comprises execution of time synchronization to the outdoor 5G RAN node, and the time synchronization utilizes a Synchronization Signal Block (SSB) correlator to align with a symbol timing of the outdoor 5G RAN node.

3. The repeater device according to claim 1, wherein the decode of the captured publicly broadcast synchronization signals is independent of the additional signaling and the explicit coordination from the outdoor 5G RAN node,
the controller is further configured to re-configure access beams from the relay radio antenna to match UE directions of the one or more indoor UEs associated with the outdoor 5G RAN node, and
the re-configuration of the access beams is independent of the additional signaling and the explicit coordination from the outdoor 5G RAN node.

4. The repeater device according to claim 3, wherein the communication of the synchronized publicly broadcast synchronization signals is for indoor distribution of the synchronized publicly broadcast synchronization signals to the one or more indoor UEs, and
the capture of the publicly broadcast synchronization signals and the communication of the synchronized publicly broadcast synchronization signals are independent of the additional signaling and the explicit coordination from the outdoor 5G RAN node.

5. The repeater device according to claim 4, wherein the relay radio antenna is further configured to communicate, one of directly or via the first set of indoor relay devices, beam configurations of the access beams to the one or more indoor UEs,
the controller is further configured to self-configure the beam configurations of the access beams based on information related to the one or more indoor UEs, and
communication of cellular mmWave signals between the one or more indoor UEs and the outdoor 5G RAN node is via the repeater device.

6. The repeater device according to claim 1, wherein the controller is further configured to select a first operational mode in a case where only publicly broadcasted information from the outdoor 5G RAN node to the one or more indoor UEs is to be decoded, and wherein the publicly broadcasted information does not include user data.

7. The repeater device according to claim 1, wherein the controller is further configured to select a second operational mode in a case where publicly broadcasted information from the outdoor 5G RAN node to the one or more indoor UEs and information from the one or more indoor UEs to the outdoor 5G RAN node are to be decoded.

8. The repeater device according to claim 1, wherein the communication of the synchronized publicly broadcast synchronization signals to the first set of indoor relay devices is a transparent relay process, and wherein the controller is further configured to:
decode Physical Downlink Control Channel (PDCCH) signals from the outdoor 5G RAN node during a communication session; and
extract beam configuration commands, intended for each target UE of the one or more indoor UEs, based on the decoded PDCCH signals.

9. The repeater device according to claim 1, wherein the captured publicly broadcast synchronization signals intended for the one or more indoor UEs comprise a Primary Synchronization Signal (PSS) and a Secondary Synchronization Signal (SSS).

10. The repeater device according to claim 9, wherein the captured publicly broadcast synchronization signals intended for the one or more indoor UEs further comprise at least one of broadcast channel information that includes system parameters and configuration for operation of the one or more indoor UEs, reference signals for channel estimation, synchronization and cell information, beamforming information, or cell identity.

11. The repeater device according to claim 1, wherein the donor radio antenna is further configured to scan a 5G New Radio (NR) frequency spectrum, based on a Fast Fourier Transform (FFT) operation with variable FFT size, for the capture of the publicly broadcast synchronization signals in a 5G NR spectrum,
the scan of the 5G NR frequency spectrum based on the FFT operation with the variable FFT size is to adapt to different Synchronization Signal Block (SSB) signal power levels, and the FFT operation is adapted to different SSB signal power levels for detection of SSB transmissions from the outdoor 5G RAN node.

12. The repeater device according to claim 11, wherein the controller is further configured to decode Physical Broadcast Channel (PBCH) in Synchronization Signal Block (SSB) for the decode of the publicly broadcast synchronization signals, the PBCH in the SSB is decoded for acquisition of cell identity and confirmation that the SSB is from a target gNodeB to which the repeater device is to be synchronized, and the target gNodeB is the outdoor 5G RAN node.

13. The repeater device according to claim 2, wherein the controller is further configured to:

decode synchronization signal blocks without the explicit coordination from the outdoor 5G RAN node; and execute the time synchronization and frequency synchronization to the outdoor 5G RAN node based on the decode of the synchronization signal blocks.

14. The repeater device according to claim 13, wherein the repeater device further comprises a local oscillator, and the controller is further configured to:

estimate a carrier frequency offset (CFO) based on analysis of a phase rotation of a signal of the synchronization signal blocks in a frequency domain in the time synchronization and the frequency synchronization; and compensate for the CFO in the local oscillator to align the repeater device to a carrier frequency of the outdoor 5G RAN node.

15. The repeater device according to claim 1, further comprising the plurality of indoor relay devices at a plurality of different locations in an indoor area, wherein each indoor relay device of the plurality of indoor relay devices is wirelessly interconnected in a 5G wireless mesh network configuration, the relay radio antenna is further configured to distribute the synchronized publicly broadcast synchronization signals to the first set of indoor relay devices, the first set of indoor relay devices is configured to:

receive the distributed synchronized publicly broadcast synchronization signals, and transmit the received synchronized publicly broadcast synchronization signals to a second set of indoor relay devices of the plurality of indoor relay devices to extend coverage in the indoor area, and each indoor relay device of the plurality of indoor relay devices is configured to execute time and frequency synchronization with the repeater device to serve a corresponding set of target UEs.

16. The repeater device according to claim 15, further comprising a central cloud server configured to communicate over an out-of-band frequency with the repeater device and the plurality of indoor relay devices to establish and monitor the 5G wireless mesh network configuration.

17. The repeater device according to claim 16, wherein the central cloud server is further configured to:

acquire network traffic statistics and performance metrics of each indoor relay device of the plurality of indoor relay devices in the 5G wireless mesh network configuration;

dynamically anticipate a traffic load and a bandwidth demand per zone, served by each indoor relay device of the plurality of indoor relay devices, based on the acquired network traffic statistics and performance metrics; and re-configure the 5G wireless mesh network configuration to proactively mitigate the anticipated traffic load and the bandwidth demand per zone.

18. The repeater device according to claim 17, wherein the re-configuration of the 5G wireless mesh network configuration comprises at least one of:

an antenna re-configuration of an indoor relay device from the plurality of indoor relay devices for adjustment of beamforming settings and Multiple-Input, Multiple-Output (MIMO) configurations;

execution of carrier aggregation based on concurrent utilization of a plurality of frequency bands to increase data rates in one or more affected zones in which the traffic load and the bandwidth demand are anticipated; and identification of one or more alternative connectivity paths among the plurality of indoor relay devices to proactively mitigate the anticipated traffic load and the bandwidth demand in the one or more affected zones.

19. The repeater device according to claim 1, wherein the controller is further configured to:

determine a path loss to each UE of the one or more indoor UEs based on Channel State Information Reference Signals (CSI-RS) channel, wherein the determination of the path loss is independent of the explicit coordination from the outdoor 5G RAN node; and adjust transmit power from the relay radio antenna and each indoor relay device of the plurality of indoor relay devices based on the determined path loss.

20. A method, comprising:

capturing, by a donor radio antenna of a repeater device, publicly broadcast synchronization signals from an outdoor 5G Radio Access Network (RAN) node;

decoding, by a controller of the repeater device, the captured publicly broadcast synchronization signals from the outdoor 5G RAN node;

synchronizing, by the controller, with the decoded publicly broadcast synchronization signals to align a frame structure of the donor radio antenna to a frame structure of the outdoor 5G RAN node, wherein the synchronization with the decoded publicly broadcast synchronization signals is independent of additional signaling and explicit coordination from the outdoor 5G RAN node;

communicating, by a relay radio antenna of the repeater device, the synchronized publicly broadcast synchronization signals to a set of indoor relay devices among a plurality of indoor relay devices, based on the decoded publicly broadcast synchronization signals; and executing, by the controller, frequency or spatial isolation, to reduce interference between user equipment (UEs) of one or more indoor UEs associated with the outdoor 5G RAN node, independent of the explicit coordination from the outdoor 5G RAN node.

* * * * *